United States Patent [19]

Paddock

[11] Patent Number: 4,699,176
[45] Date of Patent: Oct. 13, 1987

[54] AIR CONTROL VALVE ASSEMBLY

[75] Inventor: Gordon R. Paddock, Rochester, N.Y.

[73] Assignee: General Motors Corporation, Detroit, Mich.

[21] Appl. No.: 854,012

[22] Filed: Apr. 21, 1986

[51] Int. Cl.⁴ ............................................. F16K 11/22
[52] U.S. Cl. .................... 137/885; 137/881; 137/883; 251/45; 60/289
[58] Field of Search .............. 137/863, 881, 883, 885; 251/45; 60/289

[56] References Cited

U.S. PATENT DOCUMENTS

| 3,019,815 | 2/1962 | Lenardon et al. | 137/883 |
| 3,480,040 | 11/1969 | Erickson | 137/883 |
| 3,974,861 | 8/1976 | Goto et al. | 137/863 X |
| 4,099,701 | 7/1978 | Berger | 251/45 X |

FOREIGN PATENT DOCUMENTS 721998 11/1965 Canada ..................... 137/885

Primary Examiner—A. Michael Chambers
Assistant Examiner—John C. Fox
Attorney, Agent, or Firm—C. K. Veenstra

[57] ABSTRACT

In an exhaust emission control system for an automotive internal combustion engine, an air control valve assembly either directs air flow provided by an engine driven air pump to the engine exhaust ports or to an exhaust system catalytic converter, or diverts the air flow away from the exhaust system. The air control valve assembly has a single diaphragm with three independent diaphragm valve elements, each operated by the air pump discharge pressure.

3 Claims, 6 Drawing Figures

AIR CONTROL VALVE ASSEMBLY

TECHNICAL FIELD

This invention relates to control of air flow provided by an air pump to support oxidation of exhaust gas hydrocarbons and carbon monoxide in an internal combustion engine exhaust system.

BACKGROUND

An automotive engine may be equipped with an engine driven air pump that supplies air to the engine exhaust system to support oxidation of exhaust gas hydrocarbons and carbon monoxide. Under some operating conditions the air is supplied to the engine exhaust manifold at or near the engine exhaust ports, under other operating conditions the air is supplied to a catalytic converter in the engine exhaust system, and at times the air is diverted away from the exhaust system.

SUMMARY OF THE INVENTION

This invention provides an air control valve assembly suitable for controlling air flow from an air pump to an engine exhaust system and for either directing air to the engine exhaust ports or the catalytic converter or diverting air away from the exhaust system.

Prior air control valve assemblies having such capabilities were large complex structures with many pieces requiring an intricate assembly process. This invention provides an air control valve assembly having such capabilities that is compact and relatively simple in structure, has fewer pieces, and can be readily assembled.

In an air control valve assembly provided by this invention, a single diaphragm forms three independent diaphragm valve elements that are operated by air pump discharge pressure to respectively direct air to the engine exhaust ports, direct air to the catalytic converter, and divert air away from the exhaust system.

The details as well as other features and advantages of a preferred embodiment of this invention are set forth in the remainder of the specification and are shown in the drawings.

THE PREFERRED EMBODIMENT

Figure 1:
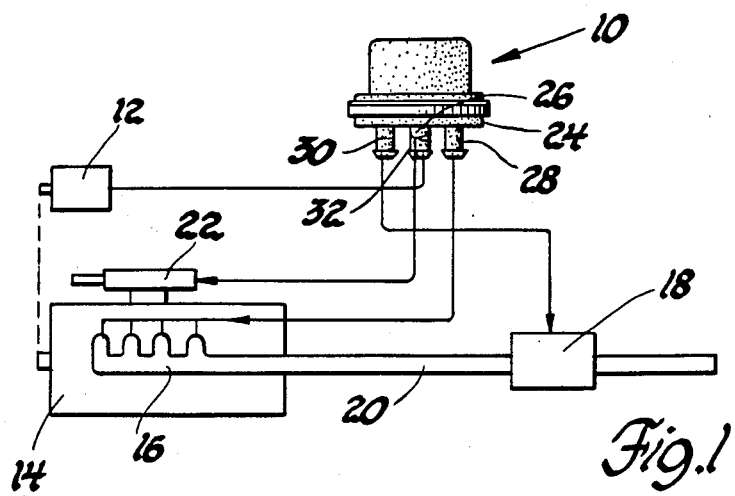
FIG. 1 is a schematic diagram of an engine exhaust emission control system employing a preferred embodiment of this air control valve assembly.
Figure 2:
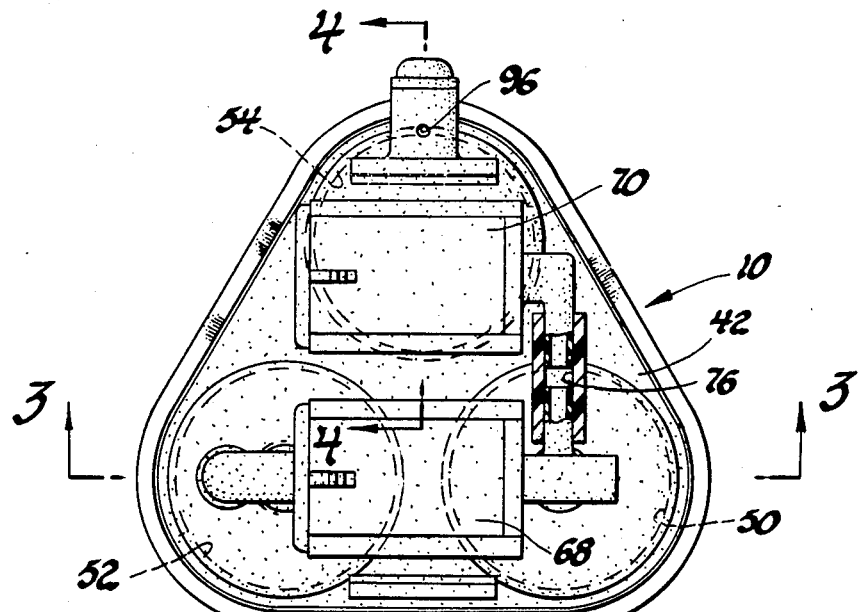
FIG. 2 is a plan view of the preferred embodiment of this air control valve assembly, with its cover removed and parts broken away to illustrate certain details of construction.
Figure 3:
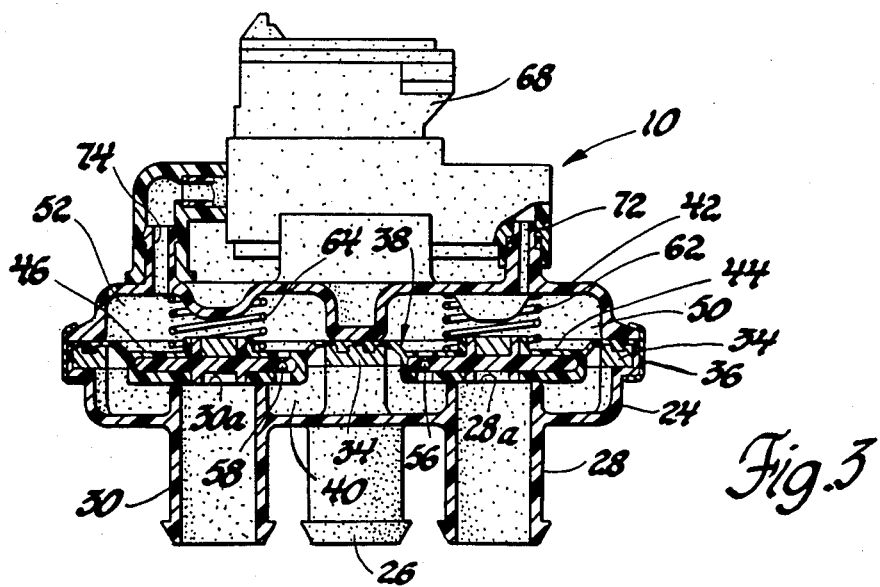
FIG. 3 is a sectional view, taken along line 3—3 of FIG. 2, of the preferred embodiment of this air control valve assembly showing the portions controlling air flow to the engine exhaust ports and the exhaust system catalytic converter.
Figure 5:
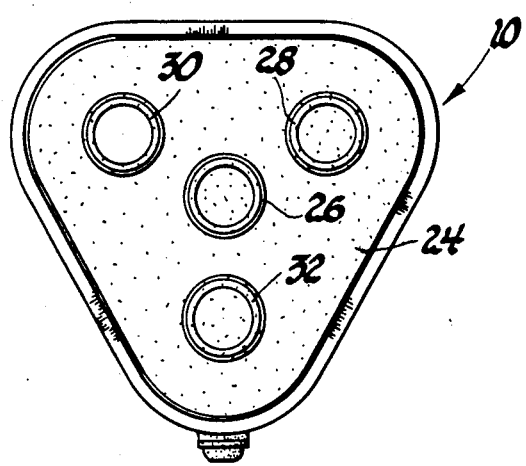
FIG. 5 is a bottom view of the preferred embodiment of this air control valve assembly showing the relative positions of the inlet and outlet fittings.

Referring first to FIG. 1, an air control valve assembly 10 receives air from an air pump 12 driven by an automotive internal combustion engine 14. Air control valve assembly 10 directs the air either to the engine exhaust manifold 16 at or near the engine exhaust ports, or to a catalytic converter 18 connected to exhaust manifold 16 by an exhaust pipe 20, or diverts the air away from the engine exhaust system—for example, to the engine air cleaner 22.

The construction of air control valve assembly 10 is shown in detail in FIGS. 2-5. It includes a base 24 having an inlet fitting 26 for receiving air from pump 12 at pressures higher than atmospheric, and also includes outlet fittings 28, 30 and 32 for respectively directing air to the engine exhaust ports, to catalytic converter 18, and to air cleaner 22.

A plate 34 is received on a shoulder 36 formed in base 24, and a single diaphragm 38 overlies plate 34 and base 24 to define an inlet chamber 40 between diaphragm 38 and base 24.

A housing 42 overlies diaphragm 38 and clamps three circular regions of diaphragm 38 against plate 34 to form three independent diaphragm valve elements 44, 46 and 48 respectively associated with outlet fittings 28, 30 and 32. A port control chamber 50 is defined between housing 42 and port diaphragm valve element 44, a converter control chamber 52 is defined between housing 42 and converter diaphragm valve element 46, and a divert control chamber 54 is defined between housing 42 and divert diaphragm valve element 48.

Diaphragm valve elements 44, 46 and 48 have orifices 56, 58 and 60 that respectively apply the pump discharge pressure in inlet chamber 40 to control chambers 50, 52 and 54. The pressure in the control chambers, together with springs 62, 64 and 66, biases the diaphragm valve elements to engage valve seats 28a, 30a and 32a formed at the ends of the outlet fittings within inlet chamber 40. Engagement of a diaphragm valve element with the associated valve seat interrupts air flow from inlet chamber 40 through the associated outlet fitting. It will be appreciated, therefor, that by venting one of the control chambers to the atmosphere, the pressure in inlet chamber 40 will lift the associated diaphragm valve element against the bias of its spring to direct air through the associated outlet fitting.

Figure 6:
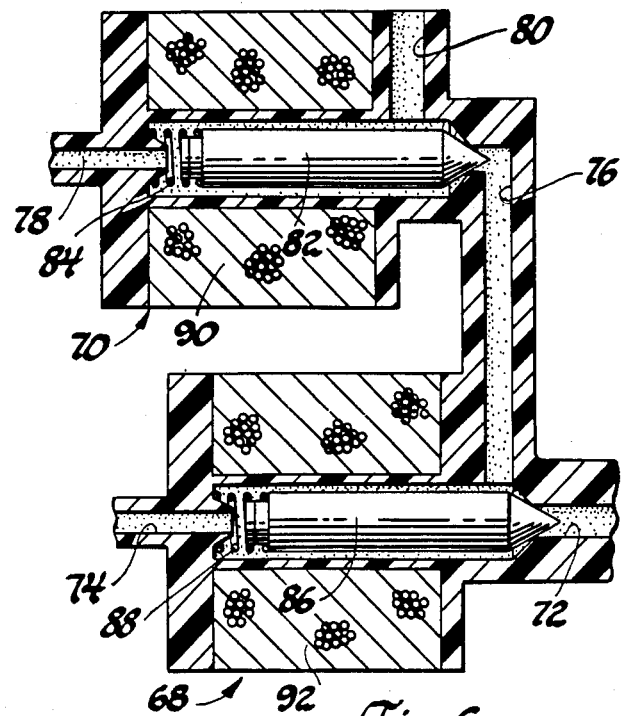
FIG. 6 is a schematic diagram showing the relationship of two solenoid operated valve elements employed in the preferred embodiment of this air control valve assembly.

A pair of solenoid-operated valve units 68 and 70 are mounted side by side on housing 42. As shown schematically in FIG. 6, valve unit 68 is connected at one end through a passage 72 to port control chamber 50 and at the other end through a passage 74 to converter control chamber 52. Valve unit 70 is connected at one end through a passage 76 to valve unit 68 and at the other end through a passage 78 to divert control chamber 54. Valve unit 70 also has an aperture or vent 80 opening to atmosphere.

Within valve unit 70, a valve member 82 is biased by a spring 84 to block passage 76 and open passage 78 to atmospheric vent 80. Divert control chamber 54 accordingly is vented to the atmosphere, and the pump discharge pressure in inlet chamber 40 lifts diaphragm valve element 48 against the bias of spring 66 to direct air through outlet fitting 32, diverting the air flow away from the engine exhaust system to air cleaner 22.

Within valve unit 68, a valve member 86 is biased by a spring 88 to block passage 72 and open passage 74. When the coil 90 of solenoid operated valve unit 70 is energized, valve member 82 is retracted against the bias of spring 84 to block passage 78 and open passages 76 and 74 to atmospheric vent 80. Converter control chamber 52 accordingly is vented to the atmosphere, and the pump discharge pressure in inlet chamber 40 lifts diaphragm valve element 46 against the bias of spring 64 to direct air through outlet fitting 30, directing air to catalytic converter 18. The air directed to converter 18 supports oxidation of exhaust gas hydrocarbons and carbon monoxide that is promoted by a catalyst bed within converter 18.

When both coil 90 of solenoid operated valve unit 70 and the coil 92 of solenoid operated valve unit 68 are energized, both valve members 82 and 86 are retracted against the bias of springs 84 and 88 to block passages 78 and 74 and open passages 76 and 72 to atmospheric vent 80. Port control chamber 50 accordingly is vented to the atmosphere, and the pump discharge pressure in inlet chamber 40 lifts diaphragm valve element 44 against the bias of spring 62 to direct air through outlet fitting 28, directing air to the engine exhaust ports. The air directed to the engine exhaust ports supports oxidation of exhaust gas hydrocarbons and carbon monoxide as the exhaust gases are discharged from the engine combustion chamber.

Figure 4:
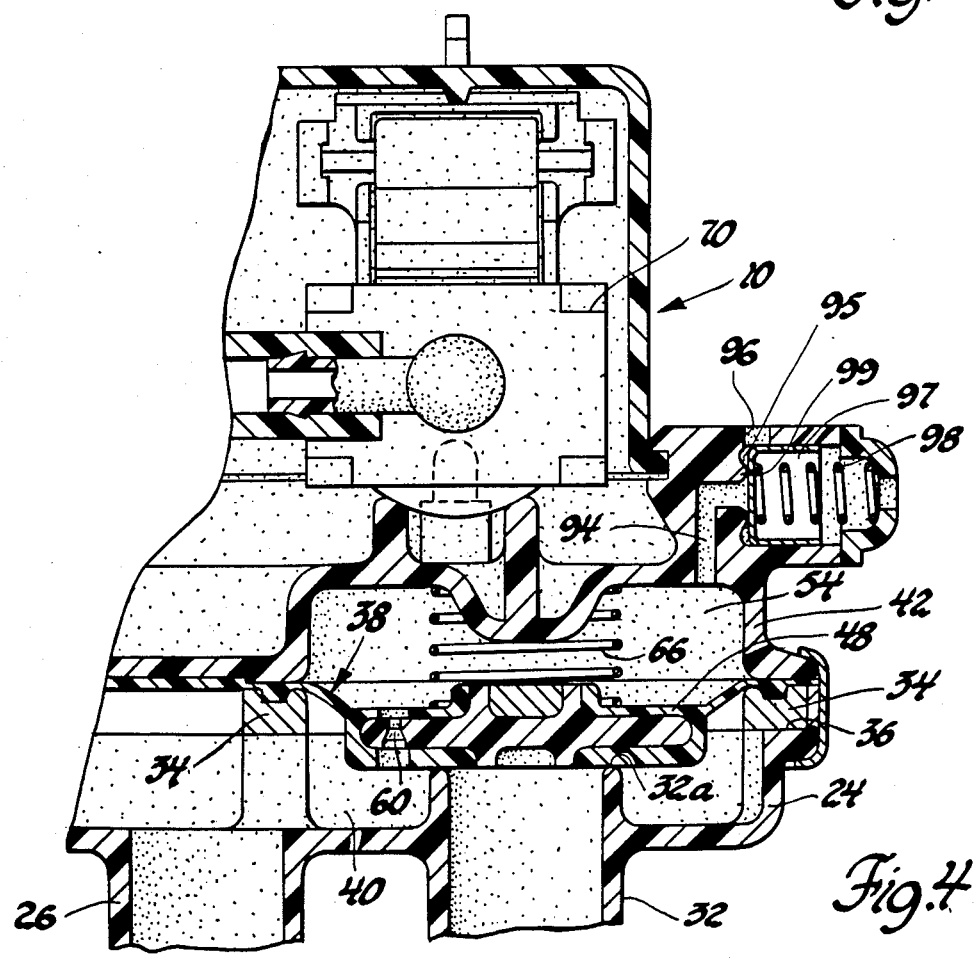
FIG. 4 is a sectional view, indicated by the line 4—4 of FIG. 2, of the preferred embodiment of this air control valve assembly showing the air inlet and the portion controlling diversion of the air flow away from the engine exhaust system, and further showing the cover installed on the valve assembly.

As shown in FIG. 4, a passage 94 leads from divert control chamber 54 to a pressure control chamber 95 having an aperture or vent 96 opening to the atmosphere. A pressure relief piston valve 97 is disposed in chamber 95 and is biased by a spring 98 to engage a valve seat 99 formed at the opening of passage 94 into chamber 95. In the event the pump discharge pressure (received in divert control chamber 54 through orifice 60) creates a force that exceeds the bias of spring 98, piston valve 97 is unseated from valve seat 99 to open passage 94 to atmospheric vent 96. Divert control chamber 54 accordingly is vented to the atmosphere, and the pump discharge pressure in inlet chamber 40 lifts diaphragm valve element 48 to relieve the excess air pressure through outlet fitting 32 to air cleaner 22. Piston valve 97 will cycle into and out of engagement with its seat 99, allowing the pressure in divert control chamber to build up to the relief pressure and then be vented; however, because orifice 60 restricts flow to divert control chamber, the effect on divert diaphragm element 48 will be dampened and the result will be a flat relief curve.

I claim:

1. An air control valve assembly comprising a base having an inlet fitting for receiving air at pressures higher than atmospheric pressure, said base further having first, second and third outlet fittings for directing air from said inlet chamber, a diaphragm overlying said base and defining an inlet chamber therebetween, said diaphragm having first, second and third independent diaphragm valve elements respectively associated with said first, second and third outlet fittings for controlling flow from said inlet chamber through said outlet fittings, a housing overlying said diaphragm, said housing and said first, second and third diaphragm valve elements respectively defining first, second and third control chambers therebetween, each of said diaphragm valve elements having an orifice for air flow from said inlet chamber to the associated control chamber whereby air flow through said orifices to the associated control chambers may bias the associated diaphragm valve elements to engage the associated outlet fittings and thereby restrict flow from said inlet chamber through the associated outlet fittings, and means for selectively venting each of said control chambers to atmosphere whereby the air pressure in said inlet chamber acts on the diaphragm valve element associated with a vented control chamber to disengage the diaphragm valve element from the associated outlet fitting and permit air flow from said inlet chamber through the associated outlet fitting.

2. An air control valve assembly for controlling air flow from an engine driven air pump to an engine exhaust system, said air control valve assembly comprising a base having an inlet fitting for receiving air from said pump at pressures higher than atmospheric pressure, said base further having a port outlet fitting for directing air from said inlet chamber to said exhaust system adjacent the engine exhaust ports, a converter outlet fitting for directing air from said inlet chamber to said exhaust system adjacent an catalyst bed adapted to promote oxidation of exhaust gas constituents, and a divert outlet fitting for diverting air from said inlet chamber away from said exhaust system, a diaphragm overlying said base and defining an inlet chamber therebetween, said diaphragm having independent port, converter and divert diaphragm valve elements respectively associated with said port, converter and divert outlet fittings for controlling flow from said inlet chamber through said outlet fittings, a housing overlying said diaphragm, said housing and said port, converter and divert diaphragm valve elements respectively defining port, converter and divert control chambers therebetween, each of said diaphragm valve elements having an orifice for air flow from said inlet chamber to the associated control chamber whereby air flow through said orifices to the associated control chambers may bias the associated diaphragm valve elements to engage the associated outlet fittings and thereby restrict flow from said inlet chamber through the associated outlet fittings, means for venting said port control chamber to atmosphere whereby the air pressure in said inlet chamber acts on said port diaphragm valve element to disengage said port diaphragm valve element from said port outlet fitting and permit air flow from said inlet chamber through said port outlet fitting to the engine exhaust ports, means for venting said converter control chamber to atmosphere whereby the air pressure in said inlet chamber acts on said converter diaphragm valve element to disengage said converter diaphragm valve element from said converter outlet fitting and permit air flow from said inlet chamber through said converter outlet fitting to the catalyst bed, and means for venting said divert control chamber to atmosphere whereby the air pressure in said inlet chamber acts on said divert diaphragm valve element to disengage said divert diaphragm valve element from said divert outlet fitting and permit air flow from said inlet chamber through said divert outlet fitting away from the engine exhaust system.

3. An air control valve assembly for controlling air flow from an engine driven air pump to an engine exhaust system, said air control valve assembly comprising a base having an inlet fitting for receiving air from said pump at pressures higher than atmospheric pressure, said base further having a port outlet fitting for directing air from said inlet chamber to said exhaust system adjacent the engine exhaust ports, a converter outlet fitting for directing air from said inlet chamber to said exhaust system adjacent a catalyst bed adapted to promote oxidation of exhaust gas constituents, and a divert outlet fitting for diverting air from said inlet chamber away from said exhaust system, a diaphragm overlying said base and defining an inlet chamber therebetween, said diaphragm having independent port, converter and divert diaphragm valve elements respectively associated with said port, converter and divert outlet fittings for controlling flow from said inlet chamber through said outlet fittings, a housing overlying said diaphragm, said housing and said port, converter and divert diaphragm valve elements respectively defining port, converter and divert control chambers therebetween, each of said diaphragm valve elements having an orifice for air flow from said inlet chamber to the associated control chamber whereby air flow through said orifices to the associated control chambers may bias the associated diaphragm valve elements to engage the associated outlet fittings and thereby restrict flow from said inlet chamber through the associated outlet fittings, an aperture for venting said control chambers to atmosphere, a first solenoid operated valve element having a deenergized position permitting flow from said divert control chamber through said aperture and obstructing flow from said port control chamber and said converter control chamber through said aperture, said first valve element having an energized position obstructing flow from said divert control chamber through said aperture and permitting flow from said port control chamber and said converter control chamber, a second solenoid operated valve element having a deenergized position permitting flow from said converter control chamber through said aperture and obstructing flow from said port control chamber through said aperture, said second valve element having an energized position obstructing flow from said converter control chamber through said aperture and permitting flow from said port control chamber through said aperture, whereby when said first and second valve elements are deenergized the air pressure in said inlet chamber acts on said divert diaphragm valve element to disengage said divert diaphragm valve element from said divert outlet fitting and permit air flow from said inlet chamber through said divert outlet fitting away from the engine exhaust system, whereby when said first valve element is energized and said second valve element is deenergized the air pressure in said inlet chamber acts on said converter diaphragm valve element to disengage said converter diaphragm valve element from said converter outlet fitting and permit air flow from said inlet chamber through said converter outlet fitting to the catalyst bed, and whereby when said valve elements are both energized the air pressure in said inlet chamber acts on said port diaphragm valve element to disengage said port diaphragm valve element from said port outlet fitting and permit air flow from said inlet chamber through said port outlet fitting to the engine exhaust ports, and wherein said divert control chamber has an additional aperture, and a pressure relief valve permits flow from said divert control chamber through said additional aperture when the pressure in said divert control chamber exceeds a selected maximum, whereby when said pressure relief valve permits flow through said additional aperture the air pressure in said inlet chamber acts on said divert diaphragm valve element to disengage said divert diaphragm valve element from said divert outlet fitting and permit excess air to flow from said inlet chamber through said divert outlet fitting away from the engine exhaust system.

\* \* \* \* \*